(12) United States Patent
Semones et al.

(10) Patent No.: US 8,707,775 B2
(45) Date of Patent: Apr. 29, 2014

(54) SYSTEM AND METHOD FOR TESTING A RAIL CAR BRAKE SYSTEM

(75) Inventors: Cole Frantz Semones, Salem, VA (US); Michael Grissom, Salem, VA (US)

(73) Assignee: Graham-White Manufacturing Company, Salem, VA (US)

( * ) Notice: Subject to any disclaimer, the term of this patent is extended or adjusted under 35 U.S.C. 154(b) by 297 days.

(21) Appl. No.: 13/219,945

(22) Filed: Aug. 29, 2011

(65) Prior Publication Data

US 2013/0047705 A1    Feb. 28, 2013

(51) Int. Cl.
  *G01L 5/28* (2006.01)
(52) U.S. Cl.
  USPC ............................................................ 73/121
(58) Field of Classification Search
  USPC ....................................................... 73/121, 39
  See application file for complete search history.

(56) References Cited

U.S. PATENT DOCUMENTS

| | | | | |
|---|---|---|---|---|
| 702,679 | A * | 6/1902 | Saum et al. | 73/39 |
| 5,808,909 | A * | 9/1998 | Rees | 702/114 |
| 5,936,153 | A * | 8/1999 | Steckler et al. | 73/121 |
| 6,269,682 | B1 * | 8/2001 | Vaughn | 73/39 |
| 6,334,354 | B2 * | 1/2002 | Vaughn et al. | 73/39 |
| 7,054,777 | B2 * | 5/2006 | Crane et al. | 702/114 |
| 2008/0276691 | A1 | 11/2008 | Vaughn | |
| 2009/0198406 | A1 * | 8/2009 | Brown et al. | 701/31 |
| 2009/0206652 | A1 * | 8/2009 | Olson | 303/27 |

* cited by examiner

*Primary Examiner* — Lisa Caputo
*Assistant Examiner* — Philip Cotey
(74) *Attorney, Agent, or Firm* — Dority & Manning, P.A.

(57) ABSTRACT

A system for testing a rail car brake system includes a valve manifold having valves that selectively supply and vent test air to or from the brake system. A control circuit is operatively connected with the valve manifold and configured to operate in a first mode to automatically position the valves according to a prescribed test and to operate in a second mode to allow manual positioning of the valves. A method for testing a rail car brake system includes connecting test air to a valve manifold, connecting the valve manifold to the brake system, and testing the brake system using a control circuit configured to automatically position valves in the valve manifold according to a prescribed test. The method further detects a failed test result in the brake system and troubleshoots the brake system using the control circuit to manually position valves in the valve manifold.

20 Claims, 5 Drawing Sheets

SYSTEM AND METHOD FOR TESTING A RAIL CAR BRAKE SYSTEM

FIELD OF THE INVENTION

The present invention generally involves a system and method for testing a rail car brake system. Particular embodiments of the present invention may be used to troubleshoot and/or retest one or more valves or other components in the rail car brake system.

BACKGROUND OF THE INVENTION

Railway trains and rail cars typically include a pneumatic brake system. The brake system is critical to the safe operation of the rail cars and is therefore subject to periodic testing to ensure the integrity and satisfactory performance of the brake system. In the United States, the Association of American Railroads (AAR), in conjunction with the Federal Railway Administration, has promulgated and adopted a Manual of Standards and Recommended Practices. Standard S-4027, Automated Single Car Test Procedure, Conventional Brake Equipment—Design and Performance Requirements, incorporated herein by reference in its entirety for all purposes, provides a series of tests of the rail car brake system that measure the pressures and flow rates of the air in the brake system under various conditions. These pressure and flow rate measurements are then used to verify that the brake system has sufficient physical integrity and will perform satisfactorily under expected operational conditions.

Various devices and methods exist to test rail car brake systems. For example, U.S. Pat. No. 7,054,777, assigned to the same assignee as the present invention and incorporated herein by reference in its entirety for all purposes, describes and illustrates an automated rail car test device that includes a pneumatic circuit connected to an electrical circuit. The pneumatic circuit connects a supply of test air to the brake system being tested, and the electrical circuit is programmed to manipulate various combinations of valves in the pneumatic circuit to allow an operator to accomplish the tests required by S-4027. In the event that a portion of the brake system fails to satisfy an individual test, the operator must repair or replace any faulty part(s) and re-perform those portions of the test that may have been affected by the repair or replacement without verification that the problem was corrected.

Although effective at accomplishing the tests required by S-4027, the automated rail car test devices in the market generally do not assist the operator in troubleshooting or re-testing the brake system. For example, in some instances, the operator may need to disconnect the automated rail car test device from the brake system and connect a manual test device or other valve manifold to the brake system to perform troubleshooting needed to identify the faulty part(s). In addition, the automated rail car test devices in the market provide little or no capability for the operator to test the repair or replacement separately, apart from the tests required by S-4027. As a result, the operator may re-perform some of the tests required by S-4027, only to find that the repair or replacement did not correct the problem, resulting in further delays in successfully completing the tests. Therefore, an improved system and method for testing rail car brake systems that can assist the operator in troubleshooting and re-testing the brake systems would be useful.

BRIEF DESCRIPTION OF THE INVENTION

Aspects and advantages of the invention are set forth below in the following description, or may be obvious from the description, or may be learned through practice of the invention.

One embodiment of the present invention is a system for testing a rail car brake system. The system includes a valve manifold having a plurality of valves that selectively supply and vent test air to or from the rail car brake system. A control circuit is operatively connected with the valve manifold and configured to operate in a first mode to automatically position the plurality of valves according to a prescribed test and to operate in a second mode to allow manual positioning of the plurality of valves.

Another embodiment of the present invention is a method for testing a rail car brake system that includes connecting a supply of test air to a valve manifold, connecting the valve manifold to the rail car brake system, and testing the rail car brake system using a control circuit configured to automatically position one or more valves in the valve manifold according to a prescribed test. The method further detects a failed test result in the rail car brake system and troubleshoots the rail car brake system using the control circuit to manually position one or more valves in the valve manifold.

The present invention may also include a method for testing a rail car brake system that includes connecting a supply of test air to a valve manifold, connecting the valve manifold to the rail car brake system, and testing the rail car brake system using a control circuit configured to automatically position one or more valves in the valve manifold according to a prescribed test. The method further detects a failed test result in the rail car brake system and retests the rail car brake system using the control circuit to manually position one or more valves in the valve manifold.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
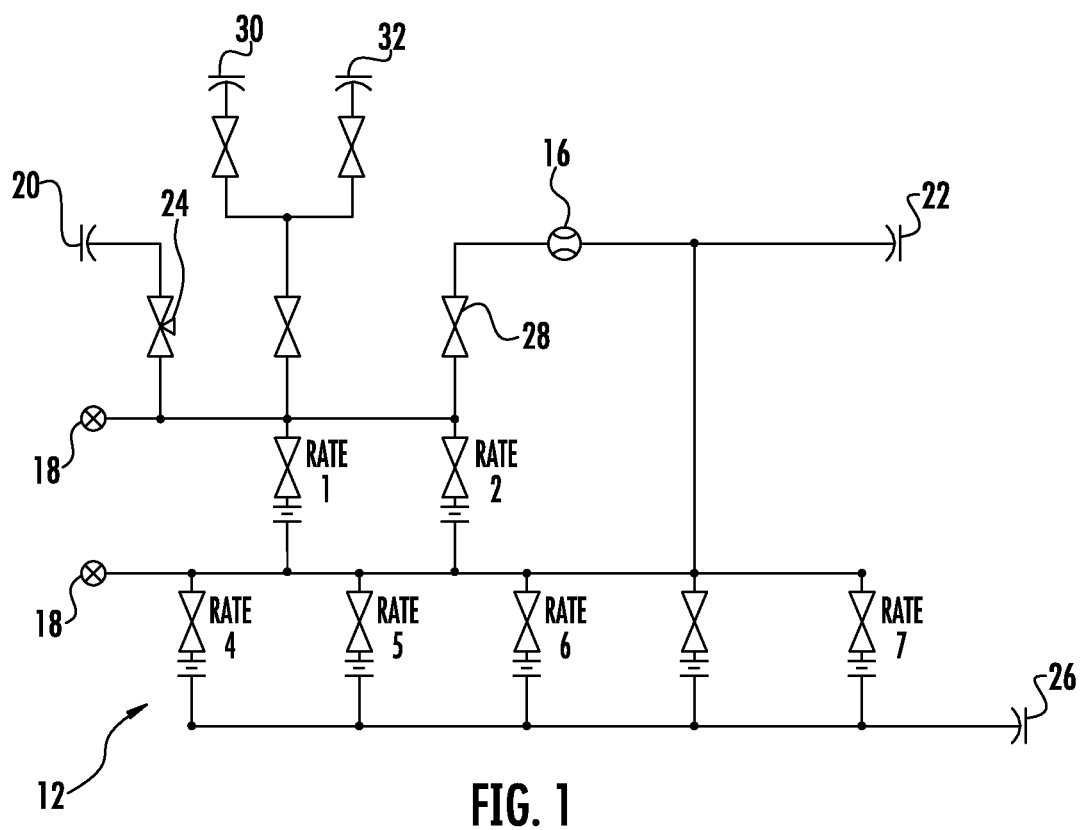
FIG. 1 is a block diagram of a pneumatic circuit according to an embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention provide a system 10 and method for testing a rail car brake system. The system 10 generally includes a valve manifold 12 and a control circuit 14. Although particular embodiments of the valve manifold 12 and control circuit 14 are provided to describe and enable the present invention, these embodiments are provided for illustration only and are not intended to limit the scope of the present invention as recited in the claims.

FIG. 1 provides a block diagram of an exemplary valve manifold 12 according to a particular embodiment of the present invention. As shown, the valve manifold 12 generally includes one or more flow meters 16, pressure sensors 18, valves, and orifices that connect an air supply 20 to a brake pipe 22 of the brake system being tested. The particular flow meters 16 and pressure sensors 18 used are not distinguishing features of the present invention and include any meters and sensors known to one of ordinary skill in the art for measuring the desired characteristics of the test air. The air supply 20 provides test air to the valve manifold 12 at a sufficient flow rate to meet the brake system test requirements. The connections between the valve manifold 12 and the air supply 20 or brake pipe 22 may be made using quick disconnects, some of which may also be known as "Glad-Hands," as will be described in more detail later. The test air first passes through a pressure regulator 24 to reduce the test air pressure to the particular pressure required by the brake test. The pressure regulator 24 may be any conventional regulator known to one of ordinary skill in the art, such as a Control Air Model M130-BCG, that is capable of reducing the pressure of the test air to the desired pressure. A set of six valves and orifices (labeled in FIG. 1 as Rate 1, 2, 4, 5, 6, and 7) are used to raise or lower the pressure in the rail car's brake pipe at rates specified by S-4027. Depending on the particular positions of the six valves, the test air is either supplied to the brake pipe 22, vented to atmosphere 26, or held in a static condition.

As shown in FIG. 1, the valve manifold 12 may further include additional, optional components, the structure and function of which are readily apparent to one of ordinary skill in the art. For example, the valve manifold 12 may include a valve 28 at the inlet of the flow rate meter 16 to prevent air flow through the meter 16 during particular tests. Similarly, the valve manifold 12 may include additional valves and associated piping for connecting to additional portions of the brake system, such as an auxiliary reservoir 30 and/or an emergency reservoir 32. Each of the valves previously described or otherwise included in the valve manifold 12 may be remotely operable valves, such as solenoid controlled valves, capable of being remotely and automatically operated by the control circuit 14, as will now be described in more detail.

Figure 2:
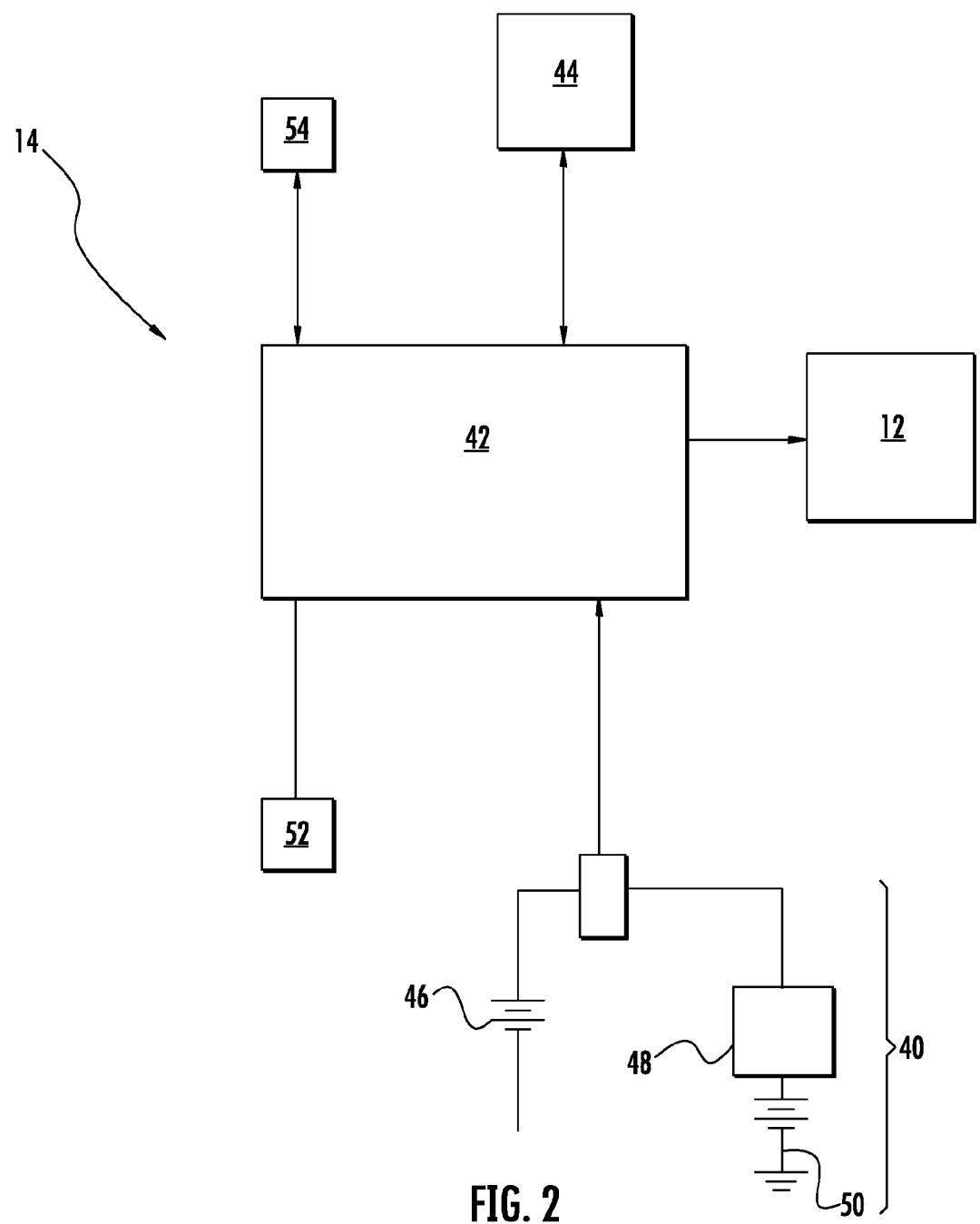
FIG. 2 is a block diagram of an electrical circuit according to an embodiment of the present invention.

FIG. 2 illustrates a block diagram of the control circuit 14 according to an exemplary embodiment of the present invention. The control circuit 14 controls the operation of the valve manifold 12 and may receive and record various sensor measurements required by the particular test being performed. The control circuit 14 generally includes a power supply 40, a controller 42, and an input/output device 44.

The power supply 40 may include any combination of DC or AC power supplies to provide a reliable source of low voltage direct current power to various system 10 components. The supplied voltage may be 5 VDC and/or 12 VDC, depending on the components used and their power requirements. A rechargeable battery 46, such as a 12 volt lead-acid battery capable of providing 20 amp-hours of power between full charges, may be used to furnish power to the system 10. If a rechargeable battery is used, the power supply 40 may include a battery charger 48 and associated circuitry for re-charging the battery 46 from an external AC or DC power source 50, with the AC power rectified, regulated, and reduced, as necessary, to achieve the required low voltage, direct current.

The technical effect of the controller 42 is to operate the valve manifold 12, interface with a user through the input/output device 44, and/or store test air data. As used herein, the controller 42 may include any combination of microprocessors, circuitry, or other programmed logic circuit and is not limited to any particular hardware architecture or configuration. Embodiments of the systems and methods set forth herein may be implemented by one or more general-purpose or customized controllers 42 adapted in any suitable manner to provide the desired functionality. The controller 42 may be adapted to provide additional functionality, either complementary or unrelated to the present subject matter. For instance, one or more controllers 42 may be adapted to provide the described functionality by accessing software instructions rendered in a computer-readable form. When software is used, any suitable programming, scripting, or other type of language or combinations of languages may be used to implement the teachings contained herein. However, software need not be used exclusively, or at all. For example, as will be understood by those of ordinary skill in the art without requiring additional detailed discussion, some embodiments of the systems and methods set forth and disclosed herein may also be implemented by hard-wired logic or other circuitry, including, but not limited to application-specific circuits. Of course, various combinations of computer-executed software and hard-wired logic or other circuitry may be suitable, as well.

As shown in FIG. 2, the controller 42 may include programming instructions to control the valve manifold 12, record and store data measurements, and/or communicate with the operator through the input/output device 44. The controller 42 may include both onboard flash or volatile memory and/or associated non-volatile memory 52. In addition, the controller 42 may include one or more interface connections, such as a USB port, firewire, or similar pathway, to a remote storage device 54. In this manner, data and/or programming instructions may be transferred to or received from the controller 42, as desired.

Figure 3:
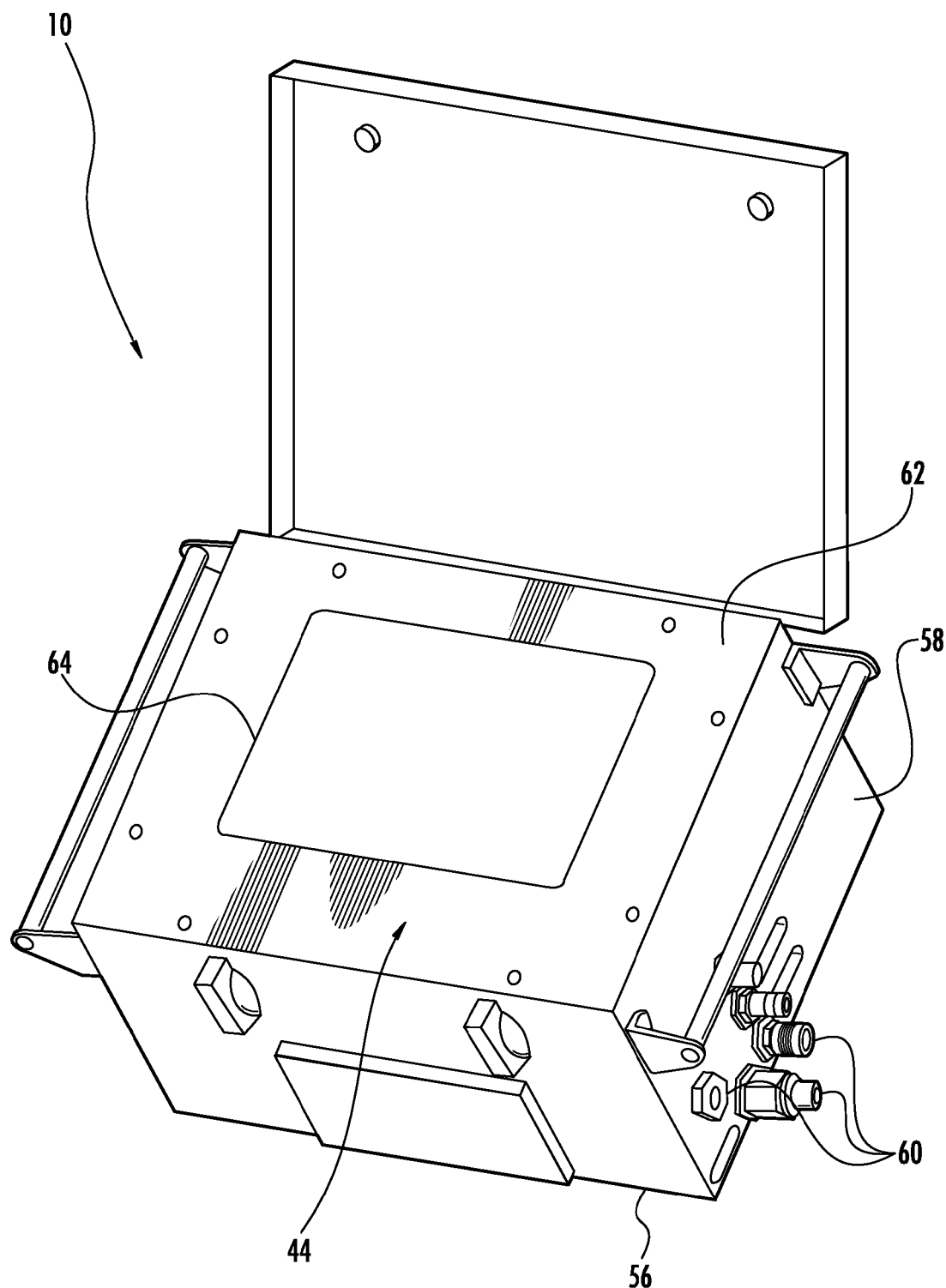
FIG. 3 is a perspective view of a system according to one embodiment of the present invention.

FIG. 3 illustrates one embodiment of the system 10 in which the valve manifold 12 and control circuit 14 are encased in a suitcase-sized container 56. The container 56 provides a portable and secure enclosure for storing, moving, protecting, and setting up the system 10 at remote locations. A side panel 58 of the container 56 may include various quick disconnects 60 for connecting the system 10 to the supply of test air 20 and/or brake pipe 22. A front panel 62 of the container 56 may include the input/output device 44 for communicating with the operator. The input/output device 44 may include, for example, a CRT, LED, OLED, or LCD display 64 and/or a conventional keyboard or other touch-screen device, for receiving manual commands to reposition one or more valves in the valve manifold 12 and/or communicating with the control circuit 14.

Figure 4:
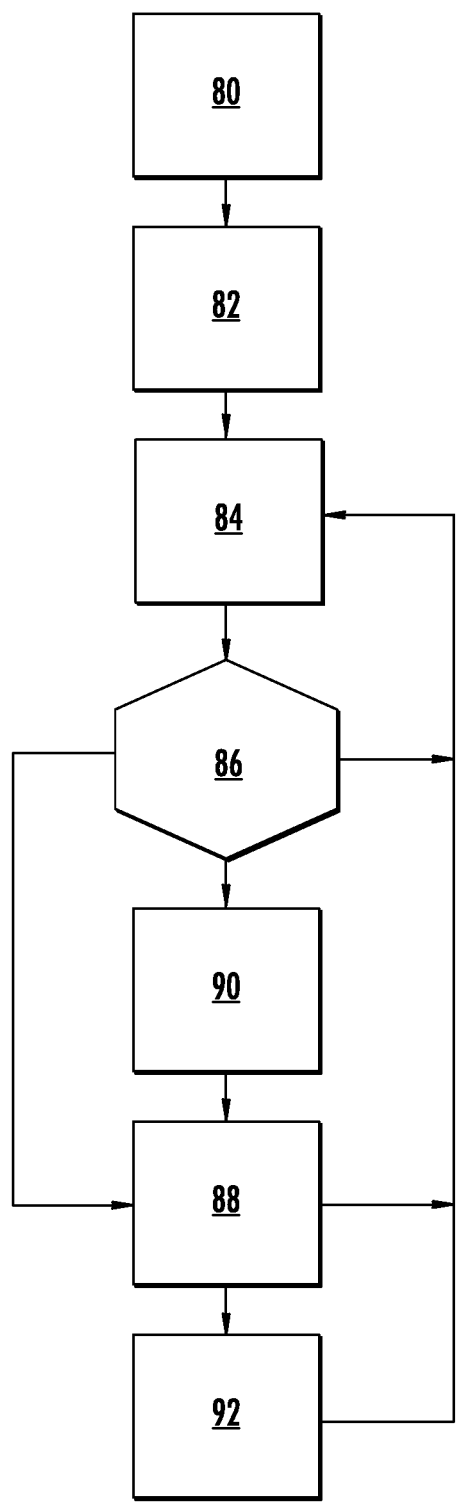
FIG. 4 is a flow diagram of an algorithm within the scope of the present invention.

FIG. 4 provides a flow diagram of a method for testing a rail car brake system within the scope of the present invention. At box 80, the operator may connect the air supply 20 to the valve manifold 12 and perform one or more preliminary tests, such as a leak test of the system 10 prior to pressurizing the rail car with test air from the air supply 20. At block 82, the operator may connect the valve manifold 12 to the rail car brake system. At block 84, the operator may initiate any one of a series of tests of the rail car brake system using the controller 42 configured to operate in a first mode to automatically position one or more valves in the valve manifold 12 according to a prescribed test. The prescribed test may be, for example, one of the tests prescribed in standard S-4027.

At block 86, the controller 42 measures a pressure or flow rate of the test air in the system 10 and compares the measurement to a prescribed standard. If the measurement meets or exceeds the prescribed standard, the controller 42 returns to block 84 and automatically positions one or more valves in the valve manifold 12 according to the next prescribed test. After the successful conclusion of all prescribed tests, the controller 42 may store the test results and/or transfer the test results and/or measurements of the test air to a remote location, such as the remote storage device 54 shown in FIG. 2.

If any measurement fails to meet or exceed the prescribed standard, the controller 42 detects a failed test result in the rail car brake system. The controller 42 may indicate the suspected faulty part(s) to the operator, or the operator may know the faulty part(s) that produced the failed test result. In either event, the operator may simply repair or replace the faulty part(s), as indicated by block 88. After repairing or replacing the faulty part(s), the operator may resume operation of the controller 42 in the first mode, and the controller 42 may return to block 84 to automatically position one or more valves in the valve manifold 12 according to one or more retests appropriate for the part(s) repaired or replaced.

Figure 5:
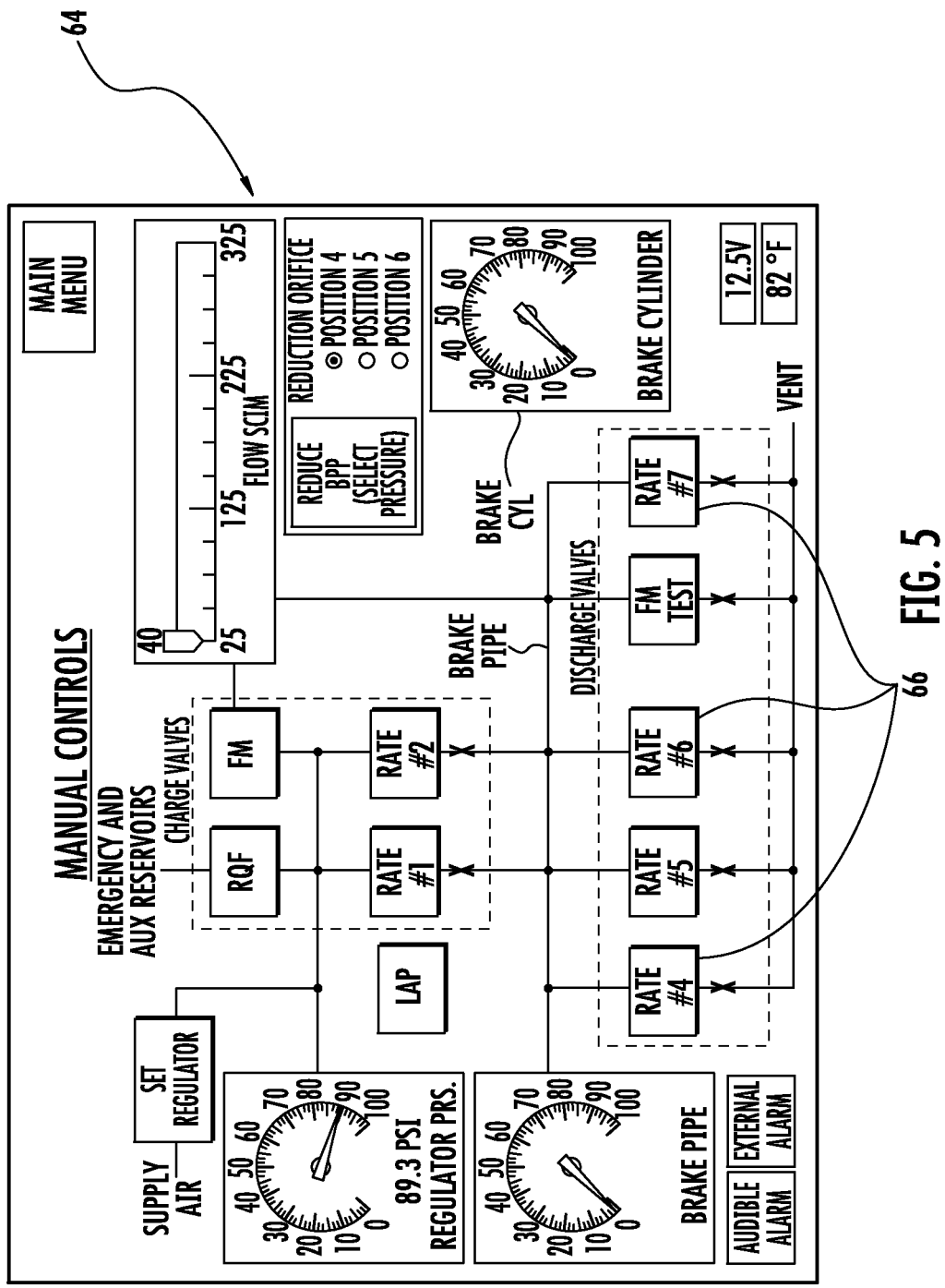
FIG. 5 is an exemplary screen shot of a display within the scope of the present invention.

If faulty part(s) that produced the failed test result is not known, the operator may switch the controller 42 to a second mode to manually position one or more valves in the valve manifold 12, as indicated by block 90. FIG. 5 provides an exemplary screen shot of the display 64 that may be presented to the operator while the controller 42 is in the second mode. As shown, the operator may touch various buttons 66 on the input/output device 44 to manually position one or more of the valves in the valve manifold 12 while monitoring various pressures and flow rates to troubleshoot the rail car brake system. Once the faulty part(s) has been identified, the operator may repair or replace the faulty part(s) as previously described with respect to block 88. After repairing or replacing the faulty part(s), the operator may resume operation of the controller 42 in the first mode, and the controller 42 may return to block 84 to automatically position one or more valves in the valve manifold 12 according to one or more retests appropriate for the part(s) repaired or replaced.

Alternately, or in addition, after repairing or replacing the faulty part(s), the operator may resume operation of the controller 42 in the second mode to manually position one or more valves in the valve manifold 12, as indicated by block 92. In this manner, the operator may perform a preliminary retest to obtain an initial indication that the repair or replacement corrected the fault before proceeding with the complete retest of all portions of the rail car brake system that may have been affected by the repair or replacement.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for testing a rail car brake system, comprising:
    a. a valve manifold having a plurality of valves that selectively supply and vent test air to or from the rail car brake system; and
    b. a controller operatively connected with said valve manifold, wherein said controller is configured to operate in a first mode to automatically position said plurality of valves according to a prescribed test and to operate in a second mode to pause said prescribed test to receive an input to allow manual positioning of said plurality of valves.

2. The system as in claim 1, further comprising an input device for receiving manual commands to reposition said plurality of valves.

3. The system as in claim 2, wherein said input device is a touch-screen.

4. The system as in claim 1, wherein said valve manifold includes a solenoid operated valve positioned by said controller.

5. The system as in claim 1, wherein said valve manifold includes a pressure sensor for measuring the pressure of said test air.

6. The system as in claim 1, wherein said valve manifold includes a flow sensor for measuring the flow rate of said test air.

7. The system as in claim 1, wherein said controller includes non-volatile memory for recording measurements of the test air.

8. The system as in claim 1, further comprising a power supply connected to said controller.

9. The system as in claim 1, further comprising an interface configured to transfer data between said controller and a memory storage device.

10. A method for testing a rail car brake system, comprising:
    a. connecting a supply of test air to a valve manifold;
    b. connecting said valve manifold to the rail car brake system;
    c. testing the rail car brake system using a controller configured to automatically position one or more valves in said valve manifold according to a prescribed test;
    d. detecting a failed test result in the rail car brake system;
    e. pausing said prescribed test; and
    f. troubleshooting the rail car brake system using said controller to manually position one or more valves in said valve manifold.

11. The method as in claim 10, further comprising retesting the rail car brake system using said controller to manually position one or more valves in said valve manifold.

12. The method as in claim 10, further comprising retesting the rail car brake system using said controller configured to automatically position one or more valves in said valve manifold according to the prescribed test.

13. The method as in claim 10, further comprising measuring at least one of pressure or flow rate of the test air.

14. The method as in claim 10, further comprising transmitting measurements of the test air to a memory storage device.

15. The method as in claim 10, further comprising touching a touch-screen device to generate the input to said controller.

16. A method for testing a rail car brake system, comprising:
   a. connecting a supply of test air to a valve manifold;
   b. connecting said valve manifold to the rail car brake system;
   c. testing the rail car brake system using a controller configured to automatically position one or more valves in said valve manifold according to a prescribed test;
   d. detecting a failed test result in the rail car brake system;
   e. pausing said prescribed test; and
   f. retesting the rail car brake system using said controller to manually position one or more valves in said valve manifold.

17. The method as in claim 16, further comprising troubleshooting the rail car brake system using said controller to manually position one or more valves in said valve manifold.

18. The method as in claim 16, further comprising retesting the rail car brake system using said controller configured to automatically position one or more valves in said valve manifold according to the prescribed test.

19. The method as in claim 16, further comprising measuring at least one of pressure or flow rate of the test air.

20. The method as in claim 16, further comprising transmitting measurements of the test air to a memory storage device.

* * * * *